United States Patent

[11] 3,596,713

[72] Inventor Leonhard Katz
  Woburn, Mass.
[21] Appl. No. 797,362
[22] Filed Jan. 27, 1969
[45] Patented Aug. 3, 1971
[73] Assignee Astro Dynamics, Inc.
  Burlington, Mass.
  Continuation of application Ser. No.
  597,747, Nov. 29, 1966, now abandoned

[54] LIQUID-SOLID HEAT TRANSPORT SYSTEM
  9 Claims, 5 Drawing Figs.
[52] U.S. Cl. .................................................. 165/107,
  165/186, 126/400
[51] Int. Cl. ........................................ F28d 15/00

[50] Field of Search ........................................ 165/104-
  — 107, 18. 1. 186. 2; 126/400

[56] References Cited
  UNITED STATES PATENTS
2,846,421 8/1958 Pollock ........................ 126/400

Primary Examiner—Charles Sukalo
Attorney—Rines and Rines

ABSTRACT: The present disclosures deals with the utilization of a plurality of particles disposed within a transport fluid and each containing either a high heat of fusion material or a high heat of vaporization material bound within an impermeable housing that is nonreactive with the fluid and the said material and that enables the absorption of heat within such particles to the substantial exclusion of the fluid, whereby the fluid may remain at a substantially fixed temperature.

INVENTOR
LEONHARD KATZ

BY Rines and Rines

ATTORNEYS 3,596,713

LIQUID-SOLID HEAT TRANSPORT SYSTEM

This application is a continuation of Ser. No. 597,747, filed Nov. 29, 1966, now abandoned.

The present invention relates to heat transfer methods, fluids and apparatus, being more particularly directed to the increasing of the effective heat transport characteristics of fluid media, such as gases and liquids, passing between heat sources and sinks.

The problem of transporting heat by way of fluid media, such as liquids and gases, has been a continuing one in many applications of engineering, including heating and ventilating systems, air-conditioning systems, refrigeration systems, temperature control systems, fluid-pumping systems, nuclear, electric and other power plants, fuel driven engines, space vehicular temperature-control systems and many other applications. Heretofore, the improvement in the heat transport characteristics of fluids employed in the above types of systems and others has been extended basically by three techniques: first, as in the case of steam-heating plants and the like, transforming the transport fluid into steam and then condensing the same; secondly, selecting and devising transport fluid of increased specific heat; and thirdly, by pumping the fluid media faster to improve its heat transport characteristics.

Discoveries underlying the present invention have permitted a new approach to the problem of increasing the heat transport characteristics of fluids that radically differs from any of the prior art techniques above mentioned and others. In summary, it has been discovered that the introduction of rather critically designed particles into the fluid medium may enable, in accordance with the teachings of the invention, the absorbing of heat within such particles to the substantial exclusion of the fluid medium whereby the medium may remain at a substantially fixed temperature.

An object of the invention, accordingly, is to provide a new and improved method of and apparatus for heat transfer that makes use of such critically designed particulate matter within the transport fluid that is to be moved between a source and a sink of heat in either direction or in both directions. A further object is to provide novel heat transfer apparatus. Still a further object is to provide novel heat transfer fluid and particle transport media. An additional object is to provide a unique method for increasing the heat transport characteristics of fluid media. Other and further objects will be explained hereinafter and will be more fully pointed out in the appended claims.

The invention will now be described in connection with the accompanying drawing, FIG. 1 of which is a graph illustrating the phenomenon underlying the invention;

FIG. 5 is a diagram similar to FIG. 2 of a further modified system particularly adapted for refrigeration systems and the like.

Figure 2:
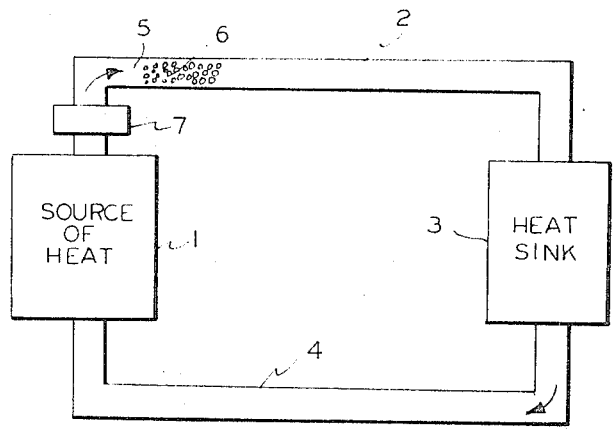
FIG. 2 is a generic block diagram illustrative of a generic heat transport system embodying the invention and in which a fluid medium, gaseous or liquid, is used to transport heat from one point to another.

Referring to FIG. 2, a source of heat is generically indicated at 1, connected by a conduit or path 2 containing the transport fluid medium 5 to a heat sink 3, with a return conduit or path 4 extending between the source and sink to close the loop. As before intimated, this circuit is generic to all heat transfer systems employing transport fluids, including the specific systems before mentioned. The apparatus of FIG. 2 may either operate as a result of natural convection produced by the heat from the source 1 wherein the fluid medium 5 is transported along the conduit 2 to the sink 3 and returned at 4 under the influence of gravity, or under the action of a pumping mechanism 7 of any well known type that may be placed anywhere within or at the ends of the conduits 2 and 4, though it is shown for illustrative purposes at the outlet of the source 1. In many home-heating systems, for example, the fluid transport medium 5 is water. In refrigeration systems, as another example, it may be one of the Freon gases such as, for example, the chloro-fluoro methanes and ethanes. As still a further illustration, conventional antifreeze and alcohol fluids may be used as in automobiles and other vehicular-cooling systems.

Figure 1:
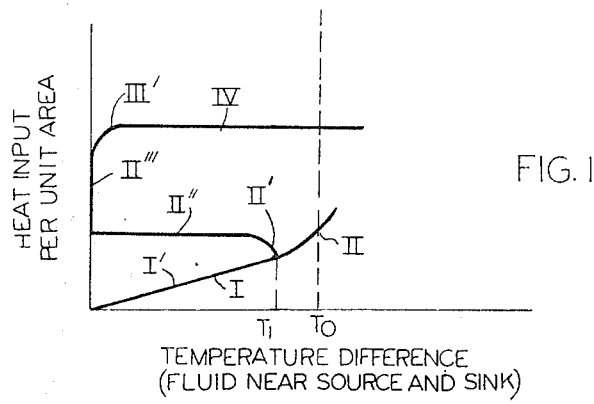

The normal behavior of fluid media, such as water and the like, is illustrated by the curve I–II of FIG. 1, plotted on a graph in which the ordinate plots the heat input per unit area to the conduit 2 and the abscissa represents the temperature difference between the fluid 5 near the heat source 1 and a region of the fluid 5 within the conduit 2 remote from the source and near the sink 3. The first, substantially slowly rising portion of the characteristic curve I represents the region in which free convection occurs, with the formation of bubbles commencing at the point indicated at the abscissa value $T_0$. This bubbling region of the boiling curve is represented by the steeply rising characteristic II. In accordance with the present invention, however, it has been found that by use of certain critically designed particulate matter 6 within the fluid medium 5, a radical change in the typical heat transfer performance can be obtained in the manner illustrated by the curve I', II', II'', II''', III', IV. Specifically, while the fluid medium starts off its heat transfer curve in the free convection region I', it reaches the point II' at a temperature difference $T_1$ below $T_0$. At temperature $T_1$ the properly designed particles 6 start to absorb the heat within the fluid medium. Continued heating results in the temperature difference approaching zero with a substantially constant heat per unit area as illustrated by the curve portion II''. As the heat input is increased, more and more particles of the particulate material 6 become involved in the absorption of the heat and commence their own natural convection, as illustrated by the vertical portion II''', which may not be strictly at the zero ordinate line. Eventually, "burn-out" will be reached at III' and the characteristics of the particle-filled transport fluid will then rapidly shift horizontally to the right, as shown by the characteristic curve portion IV.

During operation below boiling in the region II''', the heat from the source 1 is being absorbed substantially exclusively by these critically designed particles 6 and the temperature of the fluid medium 5 within the conduit 2 remains at a substantially fixed or constant value. Thus the advantages of constant transport fluid temperature are achieved without the requirement of boiling and can be attained at any desired preset temperature through the proper design of the particles 6, as later explained. If applied to the engine heatup problem, for example, the heat transport fluid during warmup reaches a temperature determined by its own specific heat at which the much greater heat-absorbing capacity of the particles 6 takes over and maintains the transport fluid substantially at warmup temperature throughout the subsequent operation of the engine. This thus permits rapid warmup and a high heat absorption for sustained operating conditions. Similarly, in home or other heating systems where the use of water alone requires a considerable time for bringing the heating system up to temperature, a rapid warmup is achievable with the above apparatus. Similar remarks apply to the various other applications and systems above discussed.

Figure 3:
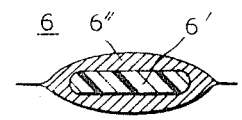
FIG. 3 is a longitudinal cross section, upon an enlarged scale, of a preferred particle for use in the system of FIG. 2.

It now remains to explain the details of the particulate members 6. In accordance with the invention, these members, which the applicant has coined "Cyto Dynamic" or "C D" particles, embody a high heat of fusion material. The term "high heat of fusion" is herein used in its scientific meaning to refer to those materials that generally have a heat of fusion in excess of about 30 B.t.u./lb.; specifically, such materials as oleic and fatty acids, water itself, calcium chloride, lithium nitrate, lithium silicate, acetic acid, p-chlorobenzoic acid, cyclohexanol, p-dinitro-benzene, elaidic acid, formic acid, methyl fumarate, p-nitrobenzoic acid and quinol. In the illustrative example of FIG. 3, the particles 6 embody a flat disc or pellet 6' of such high heat of fusion material, covered by a housing or covering 6'', shown also as of disc-shaped configuration and impermeable to both the material 6' and the transport fluid 5 at least over the temperature range of operation of the complete apparatus.

In the case where natural convection is to be used, and in some instances where pumping may also be employed, it is further desirable that the high heat of fusion material have a high expansion coefficient on change of state from solid to liquid or vice versa. In connection with the oleic acids, for example, stearic acid and palmitic acid, are highly desirable materials of this type having an expansion coefficient of approximately 0.16. Thus, the high heat of fusion material 6', as heat is absorbed by the particle 6, will expand during its liquefaction within the covering 6'', increasing its buoyancy and initiating the natural convection before discussed. It is further a requirement, moreover, that the high heat of fusion material 6' be stable over the temperature range of interest and stable with time so that the particulate matter may have a long life. The stearic and palmitic acid materials just discussed have been found to be admirably well suited to this purpose.

Figure 4:
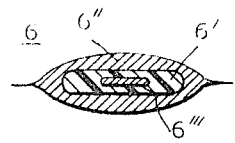
FIG. 4 is a view similar to FIG. 3 of a modification.

Not only must the housing 6'' be impermeable to the fluid transport medium 5 and to the heat of fusion material 6', no matter what its state, but it must also be nonreactive with either the heat of fusion material 6' or the transport fluid 5. In some cases, as later described, the housing 6'' may comprise a flexible impermeable membrane stretched to cover the heat of fusion material 6' tightly and of course in sealed fashion, as shown. In other applications, the covering or housing 6'' may be more rigid, as of metal, in which case, it must have sufficient rigidity to withstand the internal vacuum created as the material 6' changes state.

Where it is desired to use a magnetic field for aiding the pumping action at 7, or elsewhere, a magnetic slug or other magnetic material may be incorporated into the particle 6. One such incorporation is illustrated in FIG. 4 wherein the magnetic material 6''' is embedded in the heat of fusion material 6'; though it will be evident that the magnetic material may be disposed at other regions within or without the particle 6. Similarly, a radioactive substance 6''' may be incorporated; or the material 6''' may comprise nuclear or other radiation-absorbing material with high neutron cross section, which is useful for the heat and radiation-absorbing problems associated with nuclear reactors and the like.

For optimizing the heat transfer characteristics of the fluid particle apparatus of the present invention, the ratio of surface area-to-mass of the particle 6 should be made as large as possible. As an illustration, microencapsulation techniques may be employed to cover extremely small particles 6' of high heat fusion material with impermeable, nonreactive coverings 6'', such as thin Mylar plastic and the like. It is, of course, desirable to make the particle as small as possible and to maximize the ratio of surface area-to-mass with a minimum weight of the covering as well. Particularly for natural convection systems, neutral buoyance for the particle 6 is a desired quality wherein the heat of fusion material 6' is such that the particle sinks 6 under the influence of gravity, whereas when the heat of fusion material 6' liquifies, the buoyancy is increased and the particle 6 will float and thus provide the natural convection before discussed. Particle sizes ranging from a few microns up to fractions of an inch may find useful applications in the various different types of systems above discussed.

Experimental verification of the above-described phenomenon has been obtained with rather startling results, through the use of several thousand particles 6 constructed as hereinafter set forth and disposed within a water transport medium 5 and subjected to successively increasing heat introduced at one surface across a 6'' ×6'' cross dimension of the water medium. The point of inversion II'' was reached for a temperature difference $T_1$ of about 32° F. (far below the boiling point of water) with an input from the source 1 of about 2,200 B.t.u./hr./sq.ft. In the region II', the temperature difference dropped to substantially zero and the vertical operating region II''' was attained for up to about 7,000 B.t.u./hr./sq.ft., with the temperature difference remaining substantially zero. For the above results, the particles were disc-shaped, about one-fourth inch in the long dimension and one-sixteenth inch thick, being formed of pellets 6 of stearic acid (having a high heat of fusion of about 85 B.t.u./lb.) and tightly covered by a thin, impermeable, nonreactive flexible, epoxy-type plastic membrane covering (General Electric RTV 850 Compound) a few thousandths of an inch thick, the whole particle 6 being pressure and heat sealed about the heat of fusion material 6'.

There are occasions, both in natural convection systems and in the case of forced or pumped fluid drive, when it is advantageous to have certain of the particles in the fluid initially operate as effective heat absorbers and then to have other particles later so operate. To this end, different groups of the particles may be provided with different high heat of fusion pellets 6' having correspondingly different fusion temperatures. For example, a combination of particles 6 made from stearic acid pellets 6' (melting temperature 64° C.) and palmitic acid pellets 6' (melting point 55° C. and of different heat of fusion, approximately 70 B.t.u./lb.) were simultaneously employed. The particles with the palmitic acid (melting temperature 55° C.) heat of fusion material entered into the heat absorption convection cycle first, followed later by the stearic acid-consititured particles. Broader ranges of temperature operation may thus be achieved in this manner.

While it is believed that the above-presented theory of operation is substantially correct, it is to be understood that the invention is not dependent upon the existence or nonexistence of correct theories; it being the fact that the invention, as described, has been found to operate in practice to produce the novel results ascribed to it, as above explained.

In addition to the above-described advantages of the invention, it will be observed that through the use of the novel particulate fluid, much less fluid is required than by conventional techniques to transport the same amount of heat; or alternately and additionally, much smaller conduits and apparatus may be used for the same heat transfer results. This advantage also carries with it the benefit that the fluid transport flow may be effected at a much slower rate than with conventional systems, thus requiring less pumping equipment and the like to be used.

As before stated, an inherent and important advantage of the invention is the rapid warmup characteristics, followed by a far more effective heat-exchanging operation when the particles become substantially the exclusive heat absorbers in the system. It will be further noted, however, that whereas prior art heat-exchanging systems using radiators and convectors and the like inefficiently use the radiating or convection structure with uneven radiation and convection therealong, the present invention provides a far more efficient heat-exchanging mechanism in that the fluid medium is kept at the same temperature over the whole radiating or convection structure; that is, the heat exchange takes place without a temperature difference or temperature drop—a result not heretofore considered possible in other than steam radiators or the like. In addition, since the high heat of fusion material is encapsulated in accordance with the invention and is thus isolated and separated from the transport fluid, the invention permits the use of high heat of fusion materials below the freezing point of the transport fluid—a result which, of course, is not feasible with present-day systems. In forced or pumped convection, as before alluded to, moreover, less pressure drop or pumping force is needed than in conventional systems to transport the fluid for the same heat transfer.

While the invention has been described in connection with heat of fusion materials 6', it should be observed that similar operation can have some important applications with the aid of material 6' of high heat of vaporization. By this is meant material 6' within the particles 6 having a heat of vaporization above about 50 B.t.u./lb.; specifically, such materials as ammonia, water, sulfur dioxide, butane, isobutane, propane, carbon disulfide, carbon tetrachloride, methyl chloride, mercury vapor, ethyl ether and chloro-fluoro methanes and ethanes.

Figure 5:
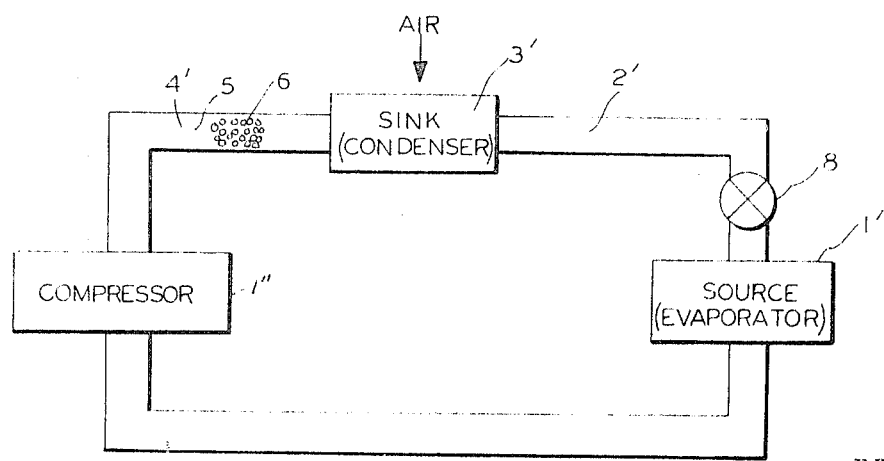

It will be noted that water, because of its peculiar liquid-to-ice and liquid-to-steam transitions, qualifies both as a suitable high heat of fusion and high heat of vaporization material. A typical illustration of the utilization of particles 6 having a high heat of vaporization material 6' embedded therein is in refrigeration systems. The material 6' may then be one of the chloro-fluoro methanes or ethanes, such as the various Freons dichloro-difluoro methane, trichloro-monofluoro methane and monochloro-difluoro methane, as illustrations. The source of heat for such a system is shown in FIG. 5 at 1' and is in this case the evaporator of the refrigerator system which extracts the heat from the system to be refrigerated. The Freon or other high heat of vaporization units 6' encapsulated in the particles 6 are heated and passed to the compressor 1'' where they are subjected to pressure to insure transformation to the vapor state. The particles 6 are then carried by the transport medium 5 along conduit 4' to the heat sink 3', which in this case is the condenser on which outside air is impinged. The units 6' then are cooled into liquid state within the particles 6 and the same are passed along the conduit 2' to a pressure-reducing valve or expansion mechanism 8 at which the conditions are now produced such that the liquid inside the particles 6 will be returned to the gaseous state, absorbing the heat of vaporization from the surrounding fluid and the source 1'.

Further modifications will occur to those skilled in this art; and all such are considered to fall within the scope and spirit of the invention as defined in the appended claims.

What I claim is:

1. A system in which a transport fluid is moved between a source and a sink of heat, said fluid being provided with a plurality of particles disposed within the fluid and each containing a material which changes phase with high-heat absorption bound within an impermeable expansible housing that is nonreactive with the fluid and the said material over the temperature range of operation of the system, said material being free to change phase and cause said housing to expand and said particles being of a type which changes its buoyancy condition when said material changes phase, said system including means for subjecting said particles to temperatures which cause change of phase of said material and which cause the buoyancy condition of said particles to change and promote natural convection of the particles in the fluid.

2. A system as set forth in claim 1 and in which said material is a high heat of fusion material.

3. A system as set forth in claim 1 and in which said material is a high heat of vaporization material.

4. A system as set forth in claim 1 and in which said particles are further provided with radioactive means.

5. A system as set forth in claim 1 and in which said particles are further provided with radiation-absorbing means.

6. A system as set forth in claim 1 and in which different particles are provided with materials of different change of phase temperatures.

7. A system as set forth in claim 1 and in which said particles are further provided with magnetic means.

8. A system as set forth in claim 1 and in which means is provided for pumping said fluid and particles between the source and the sink.

9. A system as set forth in claim 1 and in which the source and the sink are connected by a fluid recirculation loop disposed to permit gravity to affect the convection of the fluid and the particles.